Nov. 13, 1962  G. S. MANNING  3,063,304
VIBRATION ELIMINATING ATTACHMENT FOR STEERING WHEELS
Filed Aug. 8, 1961

INVENTOR
GRANT S. MANNING

BY *Shepherd & Campbell*

ATTORNEYS

United States Patent Office 3,063,304
Patented Nov. 13, 1962

3,063,304
VIBRATION ELIMINATING ATTACHMENT FOR STEERING WHEELS
Grant S. Manning, Apt. 2, 306 E. Duncan Ave., Alexandria, Va.
Filed Aug. 8, 1961, Ser. No. 130,150
7 Claims. (Cl. 74—557)

This invention relates to means for eliminating the effects of vibration set up in the steering wheels of automobiles or other vehicles during travel of such vehicles.

In its broader aspects the invention contemplates the provision of a hand grasp element and dual connections between the ends of said hand grasp element and clamps attached to the rim of a conventional steering wheel, at materially spaced points, said dual connections being of a nature to permit either normal steering by the driver through vibration absorbing springs, or by a rigid and positively acting means, in case of emergency or when quick and positive action of the steering wheel is required.

The manner in which these objects are achieved will be best understood by reference to the accompanying drawings wherein.

Figure 1:
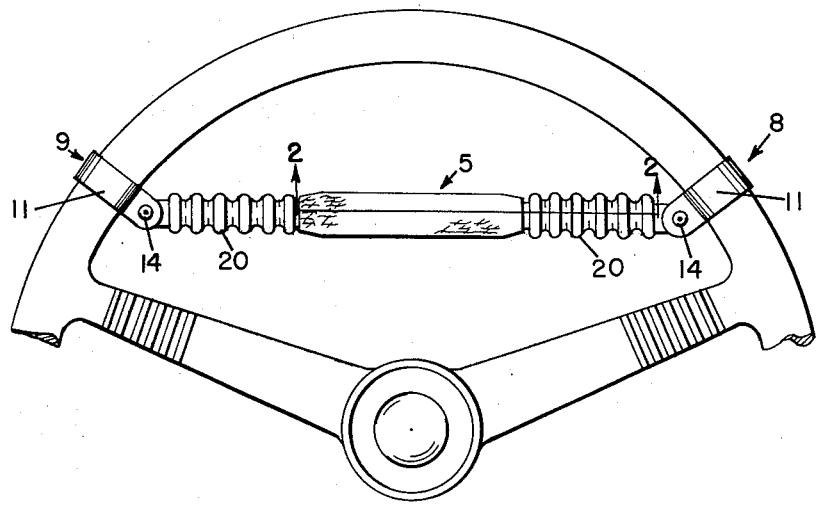
FIG. 1 is an elevation showing the complete device spanning the space between and attached to spaced clamps upon the rim of a steering wheel.
Figure 2:
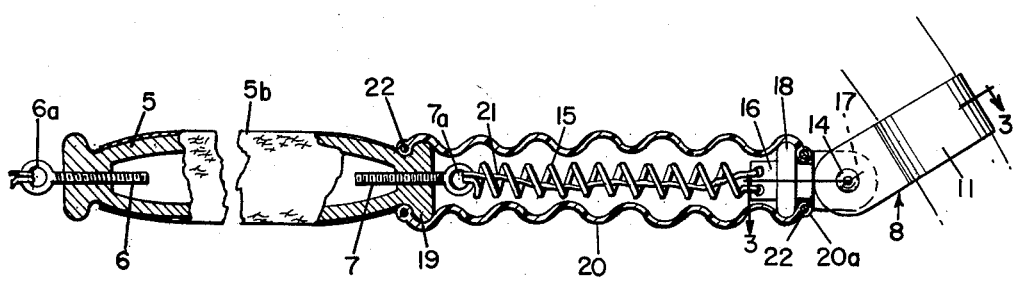
FIG. 2 is a detail fragmentary sectional view illustrating the connections between the hand grasp element and one of said clamps.
Figure 3:
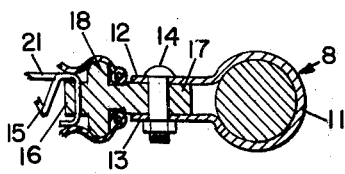
FIG. 3 is a fragmentary section of the structure of FIG. 2 taken at right angles to the plane of FIG. 2.

In the drawing, 5 designates the body portion of an elongated hand grasp element which constitutes, along with oppositely threaded rods 6 and 7, what is substantially a turnbuckle. Adjustment of this turnbuckle serves to adjust the tension of the springs hereinafter described and also the degree of slack of the cables hereinafter described. Clamps 8 and 9 are secured to the rim 10 of a conventional steering wheel. This may be the steering wheel of an automobile, a boat or any other vehicle in which the steering wheel is subjected to a considerable degree of vibration during the vehicle travel. The clamps 8 and 9 comprise the conventional body portions 11 and the outstanding lips 12 and 13. Binding screws 14 serve to draw the lips forcibly toward each other in a known way whereby to bind the clamps securely upon the rim of the steering wheel.

The inner ends of helical springs 15 are secured to eyelets 6a, 7a upon the outer ends of the threaded rods 6 and 7 and the outer ends of the springs 15 are secured to the inner ends of links 16. These links comprise portions 17 which lie between the lips of the clamps and through which the screws 14 pass. Laterally protuberant ribs 18 upon the links, together with like laterally protuberant ends 19 upon the body portion 5 of the hand grasp element, provide portions over which the resiliently constricted ends 20a of protective boots 20 may be snapped.

Wires or cables 21 connect the eyelets upon the ends of the threaded rods 6 and 7 of the turnbuckle, with the inner end portions of links 16. Cables 21 are of such construction as to be very strong and they are of such length that during normal steering of the vehicle they are slightly slack so that the steering is then done through the springs 15, under endwise movement of the hand grasp element, as the driver moves it one way or the other. However, in case of emergency, in which a positive and quick turn of the steering wheel is necessary, a positive thrust by the driver upon the hand grasp element will so exceed the movement required when the springs are functioning that the corresponding cable 21 will become taut and rigid and will exert a positive pull upon the corresponding clamp upon the steering wheel rim. The turnbuckle nature of the hand grasp element functions to adjust the effective length of the turnbuckle and thereby adjusts the degree of slack permitted in the cables.

The invention is not limited to the use of any particular material. Some of the presently used plastics, such as styrene, are very strong and the clamps 8 and 9 may be made of plastic or of metal. If made of metal they may be chrome plated.

The boots 20 house and conceal the springs and cables and these boots too may be made of any of a wide range of materials such as fabric, leather, rubber or otherwise so long as they are sufficiently flexible to yield to permit endwise movement of the hand grasp element. The body member 5 may have a covering sheet 5b secured thereon of a nature to provide a secure grip by the driver, or this body portion 5 may be of plastic and of a non-slip characteristic.

Since the structure may be made of so many different materials, it follows that the parts employed may be made of many attractive colors so that the complete article will present an ornamental attachment for a steering wheel.

When the boots are made of rubber they may be shaped to provide the resiliently contractable ends to be engaged behind the laterally protuberant portions 18 and 19 of the links 16 and body 5. When made of fabric or leather the ends of the boots may be constricted and rubber rings may be placed in portions 22 thereof.

While the structure has been shown disposed within the upper portion of the steering wheel, it is clear that it could with equal facility be disposed at the lower portion of said wheel or at any other place where its disposition along the chord of the circle defined by the rim of the steering wheel permits it to function as described. Further, more than one of the devices may be employed if desired.

It is clear that many ways will readily suggest themselves to skilled mechanics of utilizing my basic idea of effecting steering through dual connections one of which connections is yieldable and of vibration absorbing characteristics and the other of which, while permitting the steering under the action of such yieldable connections, is adapted to effect a positive and non-yieldable steering connection between the hand grasp portion and a steering wheel. Therefore, it is to be understood that the invention is not limited to the particular structure chosen for purposes of illustration but that it includes within its purview whatever changes fairly fall within either the terms or the spirit of the appended claims.

I claim:

1. A vibration absorbing attachment for the steering wheel of vehicles, comprising a pair of attaching elements adapted to be fixedly attached to the rim of a steering wheel at points materially spaced from each other, a hand grasp structure extending between said attaching elements, said structure comprising an elongated hand grasp element, springs attaching the opposite ends of the hand grasp element to the adjacent attaching elements and non-extensible members which also attach the opposite ends of the hand grasp element to the adjacent attaching elements, said non-extensible elements being of a length to permit limited endwise movement of the hand grasp element before they act upon the steering wheel.

2. In a vibration absorbing means for steering wheels the combination with a longitudinally shiftable hand grasp element, a pair of spaced attaching means securely engageable with the rim of a conventional steering wheel and dual connections between the outer ends of the hand grasp element and said attaching means, one of said dual connections consisting of an extensible spring and the other of said dual connections comprising a normally slack cable.

3. In a vibration absorbing means for steering wheels, the combination with an elongated hand grasp element, a pair of attaching clamps and means for securing said clamp firmly upon the rim of a vehicle steering wheel, springs connecting the outer ends of the hand grasp portion with the respective attaching clamps, and cables also attaching the outer ends of the hand grasp portion to said clamps, said cables being of such length as to be slightly slack to permit steering to be effected through said springs under normal steering conditions, movement of the hand grasp portion forcibly endwise in a direction to overcome the tension of said springs acting through the cable to effect a strong and positive connection between the hand grasp portion and one of said clamps whereby to effect positive steering through the cable drawn upon.

4. In a vibration absorbing attachment for steering wheels, a pair of attaching clamps and means for securing said clamps securely upon the rim of a steering wheel, a longitudinally shiftable hand grasp portion comprising an elongated body and oppositely threaded rods threaded into the ends of said body to constitute a turnbuckle, links held by the clamps and comprising end portions extending toward the turnbuckle, longitudinally extensible springs having their inner ends engaged with said oppositely threaded rods and their outer ends engaged with the end portions of the links.

5. A structure as recited in claim 4 in combination with a pair of cables attached at their inner ends to said threaded rods and at their outer ends to the said links.

6. A structure as recited in claim 4 in combination with longitudinally extensible boots connected at their inner ends to said turnbuckle and at their outer ends to said links.

7. A structure as recited in claim 4 in combination with laterally protuberant ends upon each end of the elongated body and also upon the end portions of the links and flexible and longitudinally extensible boots having constricted ends which engage over and are retained by said laterally protuberant ends.

No references cited.